United States Patent [19]

Inoue et al.

[11] 4,214,927

[45] Jul. 29, 1980

[54] GRANULAR PROPELLANT

[75] Inventors: Kazuhiro Inoue, Aichi; Fumio Matsui, Handa, both of Japan

[73] Assignee: Nippon Oil and Fats Co., Ltd., Tokyo, Japan

[21] Appl. No.: 964,040

[22] Filed: Nov. 27, 1978

[30] Foreign Application Priority Data

Nov. 30, 1977 [JP] Japan .................................. 52-143603

[51] Int. Cl.$^2$ ............................................. C06B 45/00
[52] U.S. Cl. ....................................... 149/2; 149/19.4; 149/19.8; 149/97; 149/98; 264/3 C
[58] Field of Search .................... 149/2, 19.4, 19.8, 97, 149/98; 264/3 C

[56] References Cited

U.S. PATENT DOCUMENTS

| | | | |
|---|---|---|---|
| 3,711,343 | 1/1973 | Dunigan et al. | 149/19.8 X |
| 3,894,894 | 7/1975 | Elrick | 149/98 X |
| 3,907,619 | 9/1975 | Elrick | 149/98 X |
| 3,948,697 | 4/1976 | Flanagan et al. | 149/19.8 X |

Primary Examiner—Stephen J. Lechert, Jr.
Attorney, Agent, or Firm—Stevens, Davis, Miller & Mosher

[57] ABSTRACT

A double-base granular propellant consisting mainly of nitroglycerine and nitrocellulose, said nitrocellulose being formed into a three-dimensional structure by the crosslinking reaction of a polyfunctional isocyanate, is disclosed. The propellant is superior to conventional double-base granular propellant in the shooting performance, and can be obtained by a simple solvent-granulation process.

1 Claim, No Drawings

GRANULAR PROPELLANT

BACKGROUND OF THE INVENTION (1) Field of the Invention

The present invention relates to a double-base propellant, and more particularly to a double-base propellant for artillery and small arms, which consists mainly of nitroglycerine and nitrocellulose crosslinked three-dimensionally with a polyfunctional isocyanate, and a method of producing the same.

(2) Description of the Prior Art

Granular propellants for artillery and small arms are generally desired to have such a shooting performance that the propellants have a high muzzle velocity at a low bore pressure. An effective means for increasing a muzzle velocity in a double-base propellant is to increase the amount of nitroglycerine contained therein as one of the main components.

However, in the conventional double-base propellant compositions, the mixing ratio of nitroglycerine to nitrocellulose used as main components thereof is substantially constant, and the amount of nitroglycerine contained in the double-base propellant composition is generally suppressed to as low as less than 30% by weight. One of the reasons is as follows. The use of a small amount of nitrocellulose and a large amount of nitroglycerine in the production of double-base propellant is advantageous in Japan due to its low production cost. However, when a double-base propellant containing a large amount of nitroglycerine is produced by a conventional extrusion forming process, the double-base propellant composition is soft due to its high nitroglycerine content, and the resulting granules produced by the extruding the composition and cutting the extruded composition aggregate mutually to be easily formed into a block, and are poor in the fluidity. Therefore, the final product of granular propellant cannot be easily charged into the cartridge case. Another reason is as follows. Granular propellant containing a large amount nitroglycerine are apt to have an extraordinarily high bore pressure at the shooting, and have a problem in the public security.

One of the method of solving the above described high bore pressure is disclosed in Japanese Patent Laid Open Application No. 48,409/76. In this method, the surface of granules of single-base propellant consisting mainly of nitrocellulose is covered with a restrictor consisting of a reaction product of a polyfunctional isocyanate and a polyol, whereby the combustion of the propellant is suppressed to prolong the time until the pressure generated at the combustion of the granules of the propellant reaches the highest pressure. However, in this method, it is difficult to regulate the thickness of the above described restrictor covering the surface of the propellant granules, and therefore the propellant having the coating is apt to be uneven in the combustion performance and further is low in the ignitability. Moreover, this method must be carried out by additionally adding one step to the steps in the conventional production method, and the production of a propellant by this method is expensive. The inventors have studied to obviate the above described drawbacks and accomplished the present invention.

SUMMARY OF THE INVENTION

An object of the present invention is to provide a double-base granular propellant containing nitrocellulose crosslinked with a polyfunctional isocyanate, which propellant can be easily produced, has no problems in the charging into a cartridge case, has substantially the same high muzzle velocity as that of conventional granular propellants and has a low bore pressure even in the case where the propellant contains a large amount of nitroglycerine.

Another object of the present invention is to provide a method of producing easily the above described double-base granular propellant, the nitrocellulose component of which is crosslinked with a polyfunctional isocyanate, by an improved solvent-granulation process.

One of the features of the present invention is a provision of a double-base granular propellant consisting mainly of nitroglycerine and nitrocellulose, said nitrocellulose being formed into a three-dimensional structure by the crosslinking reaction of a polyfunctional isocyanate.

Another feature of the present invention is the provision of a method of producing granular propellants by a solvent-granulation process, i.e. a process, wherein components of a double-base propellant composition consisting mainly of nitroglycerine and nitrocellulose are dissolved in an organic solvent to form a lacquer solution, and the lacquer solution is dispersed in water and formed into granules, an improvement comprising using an organic solvent, which does not react with a polyfunctional isocyanate, (hereinafter, merely referred to as organic solvent) as the solvent to prepare an aqueous dispersion of the lacquer solution containing the above described components of the double-base propellant composition, mixing the aqueous dispersion with a polyfunctional isocyanate while stirring, and further stirring the resulting mixture together with an aqueous solution of a protective colloid to form the nitrocellulose into a three-dimensional structure by the crosslinking reaction of the polyfunctional isocyanate and concurrently to form granules.

DESCRIPTION OF THE PREFERRED EMBODIMENT

The granular propellant of the present invention and the production method of the propellant will be explained in more detail.

The granular propellant of the present invention is a rigid double-base granular propellant obtained by reacting the hydroxyl groups, which remain without esterified with nitric acid in nitrocellulose of one of the main components of a double-base propellant composition consisting mainly of nitroglycerine and nitrocellulose, with a polyfunctional isocyanate to form the nitrocellulose into a three-dimensional structure and further by forming the propellant composition into granules having a globular shape or a flat shape. The size of individual granules of the granular propellant can be optionally selected depending upon the purpose. However, there are generally produced granular propellants having a flat substantially globular shape having a diameter of less than about 2 mm, and granular propellants having a flat substantially circular plate-like shape or substantially oval plate-like shape having a diameter of less than about 2 mm and a thickness of less than about 0.2 mm. However, the granular propellant of the present invention is not limited to the above described shapes.

The granular propellant of the present invention is rigid. Therefore, the granular propellant does not cause aggregation of fellow granules and is free from the formation of blocks. Accordingly, the propellant can be charged into a cartridge case without trouble. Moreover, the amount of nitroglycerine contained in the propellant as a main component can be larger than the amount of nitroglycerine contained in the conventional propellants, and therefore the use of the propellant of the present invention can lower the pore pressure and concurrently can keep the muzzle velocity to substantially the same muzzle velocity as that of conventional granular propellants, which muzzle velocity is a measure of shooting performance of granular propellant. Further, since the surface of the granular propellant of the present invention is covered with a reaction product of nitrocellulose with a polyfunctional isocyanate, said reaction product is more flame-resistant than the other propellant components, the rising of combustion pressure at the initial stage of the combustion of the propellant is suppressed, and the bore pressure is low.

When the granular propellant of the present invention contains not less than 30% by weight (hereinafter, "%" means % by weight) of nitroglycerine, the effect of nitroglycerine appears most effectively. However, when the nitroglycerine content is less than 30%, relative nitrocellulose content increases, and even a granular propellant containing less than 30% of nitroglycerine and a relatively large amount of nitrocellulose crosslinked with a polyfunctional isocyanate can be produced without problems and has a performance aimed in the present invention, and is included in the scope of the present invention. Accordingly, the granular propellant of the present invention is generally a double-base granular propellant consisting mainly of 5–80 parts by weight (hereinafter, "parts" mean parts by weight), preferably 30–75 parts of nitroglycerine, and 90–15 parts, preferably 60–20 parts, of nitrocellulose, said nitrocellulose being formed into a three-dimensional structure by the crosslinking reaction of 2–20 parts, preferably 5–15 parts, of a polyfunctional isocyanate. The granular propellant of the present invention may occasionally contain a stabilizer, an inorganic additive, a surface glossing agent and the like.

Then, the method of producing the granular propellant of the present invention will be explained. Nitrocellulose, an organic solvent and nitroglycerine, and a stabilizer occasionally used are mixed with water kept at 35°–60° C. under stirring to prepare an aqueous dispersion of a lacquer solution containing the components of a double-base propellant composition. The resulting aqueous dispersion of the lacquer solution is kept at 35°–60° C., mixed with a polyfunctional isocyanate under stirring occasionally together with an inorganic additive, such as potassium nitrate or the like as a flash reducing agent, and further mixed with an aqueous solution of a protective colloid-forming agent under stirring, whereby the nitrocellulose in the double-base propellant composition is formed into a three-dimensional structure by the crosslinking reaction of the polyfunctional isocyanate, and at the same time granules having a desired shape are formed. In this case, the shape of the resulting granules depends mainly upon the amount of the organic solvent as described later. Further, when flat granules are formed, the thickness of the granules decreases with the lapse of stirring time at the granulation, and the thickness becomes constant after the lapse of a certain period of time (for example, about 20 minutes). After the completion of the above described granulation, the mixture of the resulting granules, the water and the organic solvent is heated up to a distillation temperature of the organic solvent to distill off the solvent, if necessary, under vacuum. The granulation step is completed at the removal of the organic solvent by the distillation. Then, the resulting granules are boiled in an aqueous phase to remove the protective colloid-forming agent from the granules, and then subjected to a dehydration treatment to obtain a granular propellant. Then, the propellant is subjected to a surface glossing step, a drying step and a sieving step in the same manner as those in the extrusion forming process to obtain a final product. The stirring speed at the granulation step can be optionally selected depending upon the viscosity of the aqueous dispersion of the lacquer solution, the shape of the aimed granules and the like, but is generally 400–600 r.p.m. The stirring speed at the distillation step of the organic solvent is generally about 200 r.p.m. The temperature of the above described mixture in the granulation vessel can be optionally selected depending upon the viscosity of the aqueous dispersion of the lacquer solution (this viscosity varies depending upon the amount of organic solvent used) and the shape of the aimed granules. The granulation can be carried out at a temperature lower than the boiling point of the organic solvent used and higher than room temperature. However, when the temperature is too high, the resulting granules are soft and are apt to aggregate, while when the temperature is too low, the viscosity of the aqueous dispersion of the lacquer solution is high and flat granules are difficult to be produced. Therefore, the granulation is generally preferred to be carried out within the temperature range of 35°–60° C.

The above described polyfunctional isocyanate to be used in the present invention includes, for example, 2,4-toluene diisocyanate, 4,4'-diphenylmethane diisocyanate, hexamethylene diisocyanate, 1,5-naphthalene diisocyanate and the like. As the above described organic solvent, ones which do not react with the polyfunctional isocyanate are used. These solvents are methyl acetate, ethyl acetate, butyl acetate, acetone, methyl ethyl ketone and the like. Further, as the above described protective colloid-forming agent, there are used, for example, glue, starch, carboxymethyl cellulose, gum arabic and the like.

An explanation will be made with respect to the merit of the above described method of the present invention over the conventional methods.

A method of producing a propellant for artillery and small arms by the solvent-granulation process is disclosed in U.S. Pat. No. 2,027,114. However, this U.S. Patent does not disclose the technic of the present invention, wherein nitrocellulose is crosslinked by a polyfunctional isocyanate in the presence of a solvent and at the same time granules are formed, and such technic is firstly accomplished in the present invention. Moreover, the resulting granular propellant has the above described excellent property and performance, and such effect cannot be attained by the conventional solvent-granulation process or extrusion-forming process. When the extrusion-forming process, which is generally used for the production of conventional double-base propellant, is applied to the production of the granular propellant of the present invention, nitrocellulose in the double-base propellant composition is crosslinked with a polyfunctional isocyanate at the extrusion. As the result, the composition becomes rigid at the extrusion and requires an excessively high extruding pressure, and the operation is dangerous. Furthermore, according to the method of the present invention, a granular propellant can be produced in a simple production steps, in a very simple operation and in a very shot production time as compared with the conventional extrusion-forming process. That is, in the extrusion-forming process, a granular propellant is produced through mixing, kneading, extruding, cutting, warm water-washing and dehydrating steps, which require separate installations and skilled technics respectively, in a period of as long as several weeks. On the contrary, in the method of the present invention, a granular propellant is produced through simple steps comprising preparation of aqueous dispersion of lacquer solution, granulation, desolvation and dehydration. Among these steps, the steps of preparation of aqueous dispersion of lacquer solution, granulation and desolvation can be carried out in one granulation vessel through a series of simple operations comprising charging of starting materials, stirring, heating and vacuum distillation. As the result, the granular propellant of the present invention can be produced in only one day.

As described above, the method of the present invention is characterized in the step for preparing the aqueous dispersion of lacquer solution and the granulation step carried out in the presence of a polyfunctional isocyanate and an aqueous solution of protective colloid. Following to the granulation step, desolvation, boiling and dehydration steps are carried out in the same manner as those in the conventional solvent-granulation process, and thereafter surface gloss treatment, drying, sieving and blending steps are carried out in the same manner as those in the conventional extrusion-foaming process to obtain the final product.

The method of the present invention is further characterized in that the shape of granules of the aimed granular propellant can be selectively made into globular shape or flat shape by controlling the amount of an organic solvent used in the preparation of the aqueous dispersion of lacquer solution. That is, when the amount of an organic solvent is more than 7.0 times (in weight basis, hereinafter "times" in the amount means times in weight basis) of the amount of the nitrocellulose, granular propellant consisting of globular granules is obtained, and when the amount of an organic solvent is 3.5–6.5 times, preferably 4.5–6.0 times, of the amount of nitrocellulose, granular propellant consisting of flat substantially circular plate-like granules is obtained. In general, when an organic solvent is used in an excessively large amount, the resulting granular propellant has an excessively small grain size and causes a high bore pressure, and further the production of the propellant is expensive. While, when the amount of an organic solvent is too small, the viscosity of the aqueous dispersion of lacquer solution becomes high, and the formation of granules having a desired shape is difficult. In the method of the present invention, a polyfunctional isocyanate is used, and therefore granules having a desired shape can be obtained by the use of a relatively small amount of an organic solvent even in the production of a granular propellant having a relatively high nitroglycerine content as described above. Particularly, a granular propellant having a flat substantially circular plate-like shape, which is obtained by the use of an organic solvent in an amount of 4.5–6.0 times of the amount of nitrocellulose, is preferable in view of the combustibility. That is, in the flat granular propellant, individual granules have a flat substantially circular plate-like shape and have a small thickness, and therefore the combustion time of the individual granules is short. As the result, when this flat granular propellant is charged, for example, in a shotshell and shot, the propellant is completely burnt in the bore and does not form residue after burning (unburnt residue, which is discharged from the bore without burning up).

The following examples are given for the purpose of illustration of this invention and are not intended as limitations thereof. In the examples, "parts", "times" in the amount and "%" are those in weight basis.

EXAMPLE 1

Into a granulation vessel equipped with a stirrer were charged, while stirring at 50° C., 89 parts of water, 30 parts of nitrocellulose, 62.8 parts of nitroglycerine, 177 parts of ethyl acetate (5.9 times of the amount of the nitrocellulose) and 0.6 part of ethyl centralit as a stabilizer, and the stirring was further continued for about 10 minutes to produce an aqueous dispersion of lacquer solution. The aqueous dispersion of lacquer solution was further stirred at 50° C. for 5 minutes together with 7 parts of potassium nitrate and 6.6 parts of 4,4'-diphenylmethane diisocyanate, after which 188 parts of an aqueous solution containing 3.3 parts of glue dissolved therein (aqueous protective colloid solution) was added to the mixture, and the resulting mixture was stirred for about 20 minutes at a revolution rate of 500 r.p.m. to form granules. Then, the temperature of the resulting mass in the granulation vessel was raised up to 60° C., and the ethyl acetate was removed by a vacuum distillation to obtain a granular propellant. The resulting propellant was taken out from the granulation vessel, put into a barrel filled with water, boiled at 50° C. for 1 hour, washed with water to remove the glue, and subjected to a centrifugal separation to remove the water. The dehydrated granular propellant was treated with 0.05 part of graphite to make its surface glossy, and then dried at 60° C. for 1 day to obtain an aimed granular propellant. The resulting granular propellant had a flat substantially circular plate-like shape or flat substantially oval plate-like shape having an average diameter of 0.8 mm and an average thickness of 0.09 mm. The resulting granular propellant did not cause adhesion between fellow granules and was able to be smoothly charged into a cartridge case without trouble. A shooting test carried out by means of a shotshell charged with 1.25 g of the granular propellant showed that the muzzle velocity was 315 m/sec, the bore pressure was 690 kg/cm$^2$, and there was no residue after burning. Analysis of the components of the resulting granular repellant showed that only about 0.9 part of the potassium nitrate remained in the granular propellant and the ethyl acetate and glue used as granule-forming agents did not substantially remain therein.

EXAMPLES 2–6

A double-base propellant composition having a composition shown in the following Table 1 was formed into granules by the use of granulating materials (water, organic solvent, protective colloid-forming agent and the like) shown in Table 1 in the same procedure and under the same condition as described in Example 1 to produce a granular propellant of the present invention. A shooting test of the granular propellant was carried out in the same manner as described in Example 1. The shape and performance of the resulting propellant are shown in the following Table 2.

COMPARATIVE EXAMPLE 1

A double-base propellant composition having a composition shown in Table 1 was formed into granules by the use of a granulating materials shown in Table 1 in the same procedure and under the same condition as described in Example 1, except that a polyfunctional isocyanate was not used, to obtain a granular propellant. The shooting test of the resulting granular propellant was carried out in the same manner as described in Example 1. The shape of the granular propellant and the result of the shooting test are shown in Table 2.

of a polyfunctional isocyanate in Comparative example 1 was somewhat soft, caused aggregation of fellow granules, was difficult to be charged into a cartridge case, and further was very high in the bore pressure. On the contrary, as illustrated in Examples 1–6, the granular propellants of the present invention were rigid, did not cause aggregation of fellow granules and were able to be charged into a cartridge case without troubles. Moreover, the granular propellants of the present invention were equal or superior to the conventional granular propellant shown in Comparative example 2 in the shooting performances relating to the muzzle veloc- Table 1

|  | Example 2 | Example 3 | Example 4 | Example 5 | Example 6 | Comparative example 1 |
|---|---|---|---|---|---|---|
| Compounding recipe for double-base propellant composition (parts) |  |  |  |  |  |  |
| Nitroglycerine | 75 | 40 | 16.4 | 62.8 | 40.4 | 62.8 |
| Nitrocellulose | 15 | 50 | 80 | 30 | 44 | 36.6 |
| 4,4'-Diphenylmethane diisocyanate | — | 9.4 | 3 | 6.6 | — | — |
| 2,4-Toluene diisocyanate | 9.4 | — | — | — | 15 | — |
| Ethyl centralit | 0.6 | 0.6 | 0.6 | 0.6 | 0.6 | 0.6 |
| Potassium nitrate* | 7 | 7 | 7 | 7 | 7 | 7 |
| Surface glossing agent (parts) |  |  |  |  |  |  |
| Graphite*** | 0.05 | 0.05 | 0.05 | 0.05 | 0.05 | 0.05 |
| Granulating material** (parts) |  |  |  |  |  |  |
| Water for aqueous dispersion of lacquer solution | 89 | 89 | 89 | 89 | 89 | 89 |
| Water for aqueous protective colloid solution | 188 | 188 | 188 | 188 | 188 | 188 |
| Ethyl acetate | 90 | 250 | 480 | 270 | 264 | 177 |
| (times based on the amount of nitrocellulose) | (6 times) | (5 times) | (6 times) | (9 times) | (6 times) | (5.9 times) |
| Glue | 3.3 | — | 3.3 | 3.3 | 3.3 | 3.3 |
| Gum arabic | — | 3.3 | — | — | — | — |

Note:
*Amount remained in the resulting granular propellant is about 0.9 part.
**Substantially no granulating materials remained in the resulting granular propellant.
***Graphite is used in the surface gloss-giving step after granulation.

Table 2

|  | Example 2 | Example 3 | Example 4 | Example 5 | Example 6 | Comparative example 1 |
|---|---|---|---|---|---|---|
| Shape and property of granular propellant |  |  |  |  |  |  |
| Shape of granules | Flat substantially circular or oval plate | " | " | Substantially global | Flat substantially circular or oval plate | Flat substantially circular plate |
| Average diameter of granules (mm) | 0.8 | 0.7 | 0.5 | 0.3 | 0.7 | 0.8 |
| Average thickness of granules (mm) | 0.10 | 0.11 | 0.10 | 0.2 | 0.10 | 0.10 |
| Hardness | Hard | Hard | Hard | Hard | Hard | Somewhat soft |
| Residue after burning | Good | Good | Good | Good | Good | Poor (aggregation of fellow granules) |
| Result of shooting test |  |  |  |  |  |  |
| Muzzle velocity (mm/sec) | 310 | 303 | 301 | 295 | 305 | 310 |
| Bore pressure (kg/cm$^2$) | 700 | 630 | 640 | 500 | 610 | 900 |
| Residue after burning | None | None | None | A little | None | None |

COMPARATIVE EXAMPLE 2

A granular propellant for shotgun produced by a conventional extrusion-forming process, which had a substantially circular plate-shape having a diameter of 1.4 mm and a thickness of 0.2 mm, and consisted of 67.95% of nitrocellulose, 30% of nitroglycerine, 1% of ethyl centralit, 1% of potassium nitrate and 0.05% of graphite, was used, and a shooting test was carried out in the same manner as described in Example 1. As a result, the muzzle velocity was 310 m/sec, the bore pressure was 650 kg/cm$^2$ and there was no residue after burning.

As described above, the granular propellant produced by a solvent-granulation process without the use ity and bore pressure, and even in the granular propellants of Examples 1, 2, 3, 5 and 6, which had a nitroglycerine content higher than that of the granular propellant of Comparative example 2, the bore pressure was not particularly high.

That is, according to the present invention, even a granular propellant containing a large amount of nitroglycerine, which is less expensive than nitrocellulose, can be easily produced by the use of a polyfunctional isocyanate by the solvent-granulation process, and has substantially the same shooting performance as that of a double-base granular propellant containing a large amount of nitrocellulose and produced by the conventional extrusion-forming process. Further, the production cost of the granular propellant of the present invention by the solvent-granulation process is lower than that of the conventional granular propellant by the extrusion-forming process. Therefore, the present invention is very useful in industry.

What is claimed is:

1. A globular or flat double-base granular propellant consisting mainly 5-80 parts by weight of nitroglycerine and 90-15 parts by weight of nitrocellulose, said nitrocellulose being formed into a three-dimensional structure by the crosslinking reaction of 2-20 parts by weight of a polyfunctional isocyanate.

* * * * *